(12) United States Patent
Chalmers

(10) Patent No.: US 10,948,284 B1
(45) Date of Patent: Mar. 16, 2021

(54) OPTICAL PROFILOMETER WITH COLOR OUTPUTS

(71) Applicant: Scott A. Chalmers, San Diego, CA (US)

(72) Inventor: Scott A. Chalmers, San Diego, CA (US)

(73) Assignee: Filmetrics, Inc., San Diego, CA (US)

( * ) Notice: Subject to any disclaimer, the term of this patent is extended or adjusted under 35 U.S.C. 154(b) by 29 days.

(21) Appl. No.: 16/027,317

(22) Filed: Jul. 4, 2018

Related U.S. Application Data

(60) Provisional application No. 62/569,039, filed on Oct. 6, 2017.

(51) Int. Cl.
*G01B 11/24* (2006.01)
*G01B 9/02* (2006.01)
*G02B 5/20* (2006.01)

(52) U.S. Cl.
CPC ...... *G01B 11/2441* (2013.01); *G01B 9/02007* (2013.01); *G01B 9/02044* (2013.01); *G02B 5/201* (2013.01)

(58) Field of Classification Search
CPC ............ G01B 9/02063; G01B 9/02067; G01B 9/0209; G01B 11/2441; G02B 5/201
See application file for complete search history.

(56) References Cited

U.S. PATENT DOCUMENTS

| | | | | |
|---|---|---|---|---|
| 4,869,593 A | * | 9/1989 | Biegen | G01B 11/303 356/495 |
| 5,402,234 A | * | 3/1995 | Deck | G01B 9/04 356/497 |
| 8,519,314 B1 | * | 8/2013 | Farrell | G01B 11/26 250/201.3 |
| 2006/0158657 A1 | * | 7/2006 | De Lega | G01B 9/02072 356/497 |
| 2008/0123103 A1 | * | 5/2008 | Fujii | G01B 11/2441 356/496 |
| 2012/0224183 A1 | * | 9/2012 | Fay | G01B 11/2441 356/491 |
| 2015/0109623 A1 | * | 4/2015 | Abdulhalm | G01B 9/02083 356/479 |

* cited by examiner

*Primary Examiner* — Michael A Lyons
(74) *Attorney, Agent, or Firm* — Hodgson Russ LLP

(57) ABSTRACT

A system includes a light source configured to selectively output light. An optical objective is configured to couple the output light from the light source to a sample under measurement when present, and direct reflected light from the sample. A controller is configured to automatically control a color of the output light and a vertical position of the optical objective relative to the sample. The color of the light is selected from multiple colors. The vertical position includes a range of vertical positions scanned by the objective. A detector is configured to receive the reflected light and to detect focus, and output data representing a surface profile of the sample. The output data includes color images of the surface profile.

75 Claims, 10 Drawing Sheets

700

OPTICAL PROFILOMETER WITH COLOR OUTPUTS

RELATED APPLICATION

This application claims the benefit of U.S. Patent Application No. 62/569,039, filed Oct. 6, 2017.

TECHNICAL FIELD

This invention relates generally to the field of optical instrumentation.

BACKGROUND

In the field of optical instrumentation there is a need for instrumentation to generate data representing a surface profile and a color image of a sample under evaluation.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION

Figure 1:
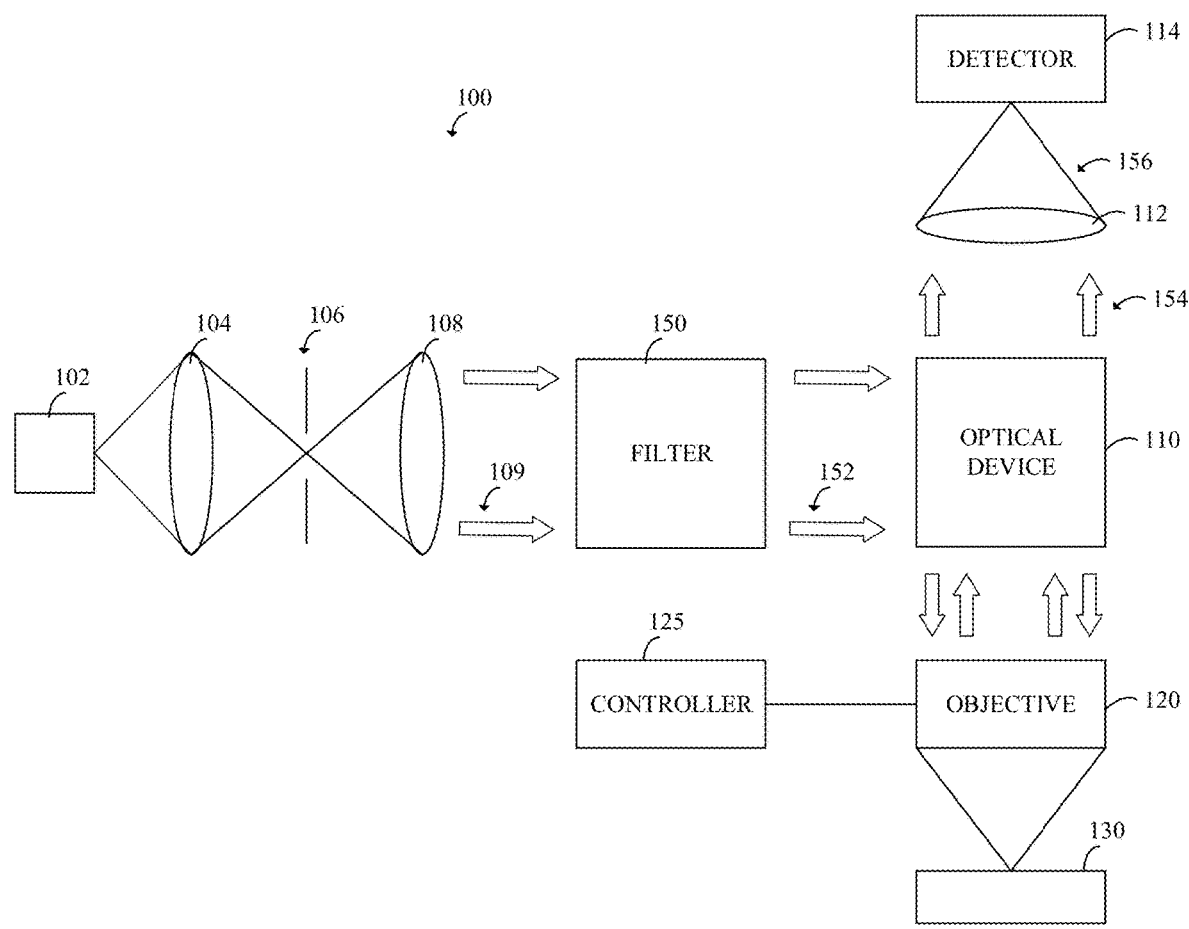
FIG. 1 is a block diagram of an electro-optical system comprising a profilometer, or surface profiler, under an embodiment.

Electro-optical (EO) systems or instrumentation are described herein that include a light source configured to selectively output light. An optical objective is configured to couple the output light from the light source to a sample under measurement when present, and direct reflected light from the sample. A controller is configured to automatically control a color of the output light and a vertical position of the optical objective relative to the sample. The color of the light is selected from multiple colors. The vertical position includes a range of vertical positions scanned by the objective. A detector is configured to receive the reflected light and to detect focus, and output data representing a surface profile of the sample. The output data includes color images of the surface profile.

The EO systems or instrumentation described herein that include optical profilometers configured to produce high depth-of-field color images. These optical profilometers include profilometers configured for vertical scanning interferometry (VSI), for example. The optical profilometers also comprise instrumentation configured for confocal microscopy, which measures the surface profile of a sample using differences in focus with a z-motion combined with the light source. More particularly, the optical profilometer in the confocal microscopy configuration comprises an intensity measuring element (e.g., measures light intensity dependent on sample surface height) along with a translation element that scans or adjusts the relative position between an objective (e.g., microscope objective) and a sample positioned on a stage in order to measure focus intensity as a function of z position. As an alternative to the z-stage translation element, an embodiment includes an optical element configured to change beam path or optical path between the objective and the sample while maintaining a fixed relationship between a position of the objective relative to the position of the sample.

Further, the optical profilometers include instrumentation configured for focus variation (FV). Still further, the optical profilometers include any instrumentation that is configured for the optical measurement of surface topography that includes a broadband light source and a 2D imaging sensor, such as instrumentation that is configured for Point Autofocus and Phase-Shifting Interferometry (PSI), as described in Optical Measurement of Surface Topography, edited by Richard Leach, Springer-Verlag, 2011. This reference also provides additional details of the VSI, confocal, and FV techniques described herein. And still further, the optical profilometers of an embodiment include instrumentation configured for combinations of configurations, such as the combination of VSI and PSI, and the combination of VSI and FV in which a VSI hardware configuration is adapted for FV by replacing the interferometric objective lens with a standard microscope objective lens.

The optical profilometers described herein, when including components or systems configured for vertical scanning interferometry (VSI), provide a non-contact optical method for surface height measurement on three-dimensional (3D) structures having varying surface profiles (e.g., vary between tens of nanometers and a few centimeters). Vertical scanning interferometry makes use of the wave superposition principle to combine waves in a way that will cause the result of their combination to extract information from those instantaneous wave fronts. This works because when two waves combine, the resulting pattern is determined by the phase difference between the two waves, meaning waves that are in phase undergo constructive interference while waves that are out of phase undergo destructive interference. A detector or image sensor is placed at the point where the two images are superimposed. Generally, a broadband "white light" source is used to illuminate the test and reference surfaces. A condenser lens collimates the light from the broadband light source, and an optical device (e.g., beam splitter) separates the light into reference and measurement beams. The reference beam is reflected by a reference component (e.g., mirror, reflector, etc.), while the measurement beam is reflected or scattered from the sample surface. The two reflected beams are relayed by the optical device to the detector, and form an interference pattern of the test surface topography that is spatially sampled by the detector (e.g., individual CCD pixels).

The interference occurs when the path lengths of the measurement beam and the reference beam are nearly matched. By scanning or changing (e.g., vertically, etc.) the measurement beam path length relative to the reference beam, a correlogram is generated at each pixel. The width of the resulting correlogram is the coherence length, which depends strongly on the spectral width of the light source. Interference occurs at the detector (e.g., pixel) if the optical path lengths of the measurement and reference beams differ less than half the coherence length of the light source. Each pixel of the detector samples a different spatial position within the image of the sample surface.

A white light correlogram (interference signal) is produced when the length of the reference or measurement beam arm is scanned by a positioning stage through a path length match. The interference signal of a pixel has maximum modulation when the optical path length of light impinging on the pixel is the same for the reference and the measurement beams. Therefore, the z-value for the point on the surface imaged by this pixel corresponds to the z-value of the positioning stage when the modulation of the correlogram is greatest. The height values of the object surface are found by determining the z-values of the positioning stage where the modulation is greatest for every pixel. The lateral positions of the height values depend on the corresponding object point that is imaged by the pixel matrix. These lateral coordinates, together with the corresponding vertical coordinates, describe the surface topography of the sample under VSI.

The optical profilometers described herein, when including components or systems configured for confocal microscopy, provide optical imaging for increasing optical resolution and contrast of a micrograph through use or inclusion of a spatial aperture or field stop placed at the confocal plane of the lens to eliminate out-of-focus light. Elimination of out-of-focus light enables the reconstruction of 3D structures from the obtained images. The principle of confocal imaging overcomes limitations of conventional wide-field microscopes in which the entire specimen is evenly flooded in light from the light source. Consequently, all portions of the specimen in the optical path are simultaneously excited and the resulting reflectance is measured at a detector coupled to the microscope.

In contrast, a confocal microscope configuration uses point illumination and an aperture in an optically conjugate plane in front of the detector to eliminate out-of-focus signal. As only light produced by reflectance very close to the focal plane can be detected, the optical resolution of the image, particularly in the sample depth direction, is relatively better than that obtained with wide-field microscopes. As only one point in the sample is illuminated at a time, two-dimensional (2D) or 3D imaging includes scanning over a regular raster (e.g., a rectangular pattern of parallel scanning lines) in the specimen. The achievable thickness of the focal plane is defined mostly by the wavelength of the light used divided by the numerical aperture of the objective lens, but also by the optical properties of the specimen. The thin optical sectioning possible makes these types of microscopes particularly good at 3D imaging and surface profiling of samples.

The optical profilometers described herein, when including components or systems configured for focus variation, combine small depth of focus of an optical system with vertical scanning to provide topographical information from the variation of focus. Because of its ability to measure steep flanks and its robustness in relation to different materials, focus variation enables the measurement of roughness and form at the same time. Focus variation of an embodiment enables the measurement of a real surface topography using optics with limited depths of field and vertical scanning. Depth measurement with focus variation is configured to search the best focus position of an optical element pointing to a sample. This focus position is related to a certain distance from the sample (depth) value. To perform a complete detection of the sample surface with full depth of field, the precision optic is moved vertically along the optical axis, while continuously capturing data from the sample surface. This means that each region of the sample surface is sharply focused. A depth map of a sample is generated by carrying out this process for many lateral positions on the sample.

Generally, the basic components of a focus variation system include an optical system with limited depth of field to detect the best focus, an illumination device or source, a detector (e.g., charge-coupled device (CCD) sensor, etc.) to detect focus, and a driving unit for focus search. More particularly, an example optical profilometer configured as a focus variation instrument includes a detector, lenses, a light source, a light director (e.g., mirror, semi-transparent mirror, beam splitter, etc.), an objective (e.g., lens with limited depth of field), a stage configured to receive a sample or specimen, vertical scan or movement component with driving unit, focus or contrast curve (e.g., calculated from the local window), light beam (e.g., from light source), analyzer (optional), polarizer (optional), and ring light (optional).

In operation, white light from light source (e.g., light-emitting diode (LED), etc.) is transmitted through the semi-transparent mirror and the objective lens to the sample. Due to variations in the topography and the reflectance of the sample, the light is reflected in different directions. The reflected light is partly collected by the objective and projected through the semi-transparent mirror and the tube lens to the CCD sensor. Depending on the vertical position of the sample in relation to the objective lens, the light is focused to varying degrees onto the CCD sensor.

By changing the vertical distance between the sample and the objective lens, the degree of focus varies from low to high and back to low again. This change of focus is related to a change of lateral contrast on the CCD sensor. By analyzing this contrast on the CCD sensor, the position where the sample was in focus can be measured. By repeating this for every lateral position on the CCD sensor, the topography of the sample in the field of view is measured. In addition to measuring the position where the sample was in focus, the color of the sample can be determined.

In order to measure the contrast in the image on the CCD sensor corresponding to each position on a sample, a small region around the actual pixel position is considered. Several methods of measuring the contrast in the image of the CCD sensor are known in the art. One method of measuring the focus includes calculating the standard deviation of the grey values of a small local region. If the focus level is very low (if the specimen is far away from the focus plane), the grey values are almost identical and the standard deviation of the grey values will be very low. In the case of a highly focused specimen, the variation of the grey values in a region is much higher and so the focus measure yields higher values.

A focus curve and its maximum is then generated or calculated. By calculating the focus at every position in the stack of images of the sample, the focus curve is determined. The focus curve includes a peak that corresponds to the most focused position, and the peak can be detected using one or more methods known in the art (e.g., maximum point, polynomial curve fitting, point spread function curve fitting, etc.). Following detection of the focus curve peak for all lateral positions of the CCD sensor, a depth map is available.

Optical profilometer configurations described herein include profilometers configured to use light sources including white light along with light of numerous different or varying colors. Profilometers described herein configured to scan or image with different light colors (e.g., red, green, blue) provide data that is used to generate color images (including large DOF images) and surface profiles from data of a single black and white (B&W) camera. This reduces system cost by eliminating the need for a separate color camera, and also reduces complexity by eliminating the need to align multiple cameras (e.g., separate B&W and color cameras) in three dimensions. Additionally, these systems provide increased image resolution by eliminating the need to correlate the pixels of multiple cameras.

In the following description, numerous specific details are introduced to provide a thorough understanding of, and enabling description for, embodiments herein. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

FIG. 1 is a block diagram of an electro-optical system 100 comprising a profilometer, or surface profiler, under an embodiment. Embodiments of the electrical-optical system described herein include measurement instruments that detect and measure the surface profile of a sample (e.g., silicon wafer, etc.). The surface profiler is a non-contact surface profiler but is not so limited. The system 100 includes a light source configured to form an aperture image. The light source (e.g., white light, light emitting diode (LED), Xenon lamp, Halogen lamp, laser, etc.) of an embodiment includes an illumination source 102, a condensing lens 104, an aperture 106 (e.g., circular, rectangular, etc.) or field stop, and a collimator lens 108 or relay. Light passing through aperture 106 impinges on the collimator lens 108 to form a beam 109 of collimated light. The size and configuration of the aperture 106 or field stop, which is selected as appropriate to a configuration of the system 100, determines the field angles in the collimated light sections of the optical system and the orientation is chosen to allow an aperture image to be projected onto the sample 130 (when present). Alternatively, the illumination source 102 may be replaced by a fiber optic light guide but is not so limited. The system 100 optionally includes one or more filters 150 positioned as appropriate to operations performed by the system 100, but is not so limited.

In this example embodiment, the collimated light 109 from the collimator lens 108 is incident on the input of the filter 150 (optional). The light output 152 from the filter 150 is incident upon an optical device 110 that is configured to divide the incident light. The optical device 110 of an embodiment includes a beam splitter 110, but is not so limited. The light is transmitted through the optical device 110 to an objective 120, which includes one or more different objective types as described in detail herein.

The system 100 includes an objective 120, and the type of the objective is selected as appropriate to operations performed by the system 100. For example, the objective 120 of an embodiment includes a Mirau interferometry objective 120 available from Nikon Corporation. Alternatively, the objective 120 includes a Michelson interferometry objective. The objective 120 of another alternative embodiment includes a Linnik interferometry objective. Additionally, the objective 120 is a custom objective as appropriate to a configuration of the electro-optical system. The objective 120 of another alternative embodiment includes a standard microscope objective, such as 10× magnification Nikon CFI60 infinity-corrected objective, which would be suitable for instruments configured for confocal and Focus Variation embodiments described herein.

The objective 120 of an embodiment includes a z-stage coupled or connected to a z-controller 125 configured to control z-axis movement of the objective 120 relative to the sample 130 (when present) or stage. Alternatively, the z-controller is coupled to control z-axis movement of the sample (stage) relative to the objective 120.

The system 100 of example embodiments such as VSI described herein comprises an objective that includes and/or is coupled or connected to a reference section or system as appropriate to a type and location of the objective and/or the reference section. Accordingly, the objective 120 is configured to focus and/or couple light to a reference component (not shown) but is not so limited. A first portion of the light focused onto the reference component from the objective 120 is reflected from the reference component and passes back through the objective 120 and returns to the optical device 110 where it forms a first aperture image. A second portion of the light focused onto the reference component passes through the reference component, which is configured to illuminate the surface of the sample 130 by focusing the second portion of the light onto the surface of the sample 130 (when present). The light emitted or reflected from the surface of the sample 130 returns through the objective 120 and forms a second aperture image on the optical device 110.

The first and second images or beams returning from the sample and the reference mirror recombine and interfere at the optical device 110. Light 154 from the optical device 110 is incident on a lens 112 where images are formed of the interference pattern of the reference mirror surface and the sample surface. The lens 112 redirects the aperture images 156 to a detector 114 (e.g., charge coupled device (CCD) camera, complementary metal-oxide semiconductor (CMOS) camera, photodiode, linear arrays, etc.). The detector of an embodiment includes and/or is coupled or connected to a processor configured to process the data from the detector and, optionally, format and/or display raw or processed data in various formats.

Conventional EO systems scan and image samples with a black and white (B&W) image sensor or camera and, as such, output black and white images of the sample or sample surface. Embodiments described herein include EO systems configured to use a single B&W camera to produce and output focused color images or maps of the actual sample or sample surface in addition to the B&W images.

Figure 2A:
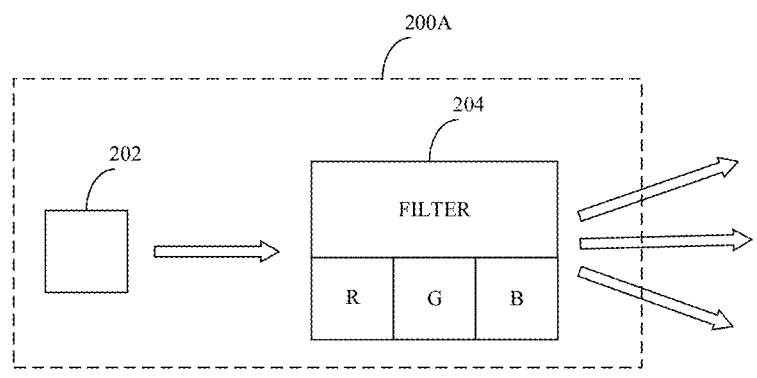
FIG. 2A is a block diagram of a light source of an EO system configured to generate color images of a sample, under an embodiment.

The light source 102 of an embodiment includes components configured to generate or output colored (non-white) light. For example, FIG. 2A is a block diagram of a light source 200 of an EO system configured to generate light for use in color imaging of samples, under an embodiment. The light source 200 is used as the light source 102 in the EO system 100 (FIG. 1), but is not so limited. The light source 200 includes a white light or illumination source 202 as described herein, and a color filter component 204. The white light source 202 is configured or positioned to direct light onto a color filter component 204, and the color filter component 204 is selectable among numerous different color filters or color filter paths. The filter component 204 of an embodiment includes red, green, and blue filters, for example, but is not so limited. The EO system 100 is configured to automatically select between different light paths each of which includes a filter of a different color (e.g., RGB) or, alternatively, automatically switch between the different filters (e.g., RGB) of the filter component 204 according to an imaging or data collection profile, as described in detail herein. The light source 200 outputs white light in the absence of a filter switched into the optical path.

Figure 2B:
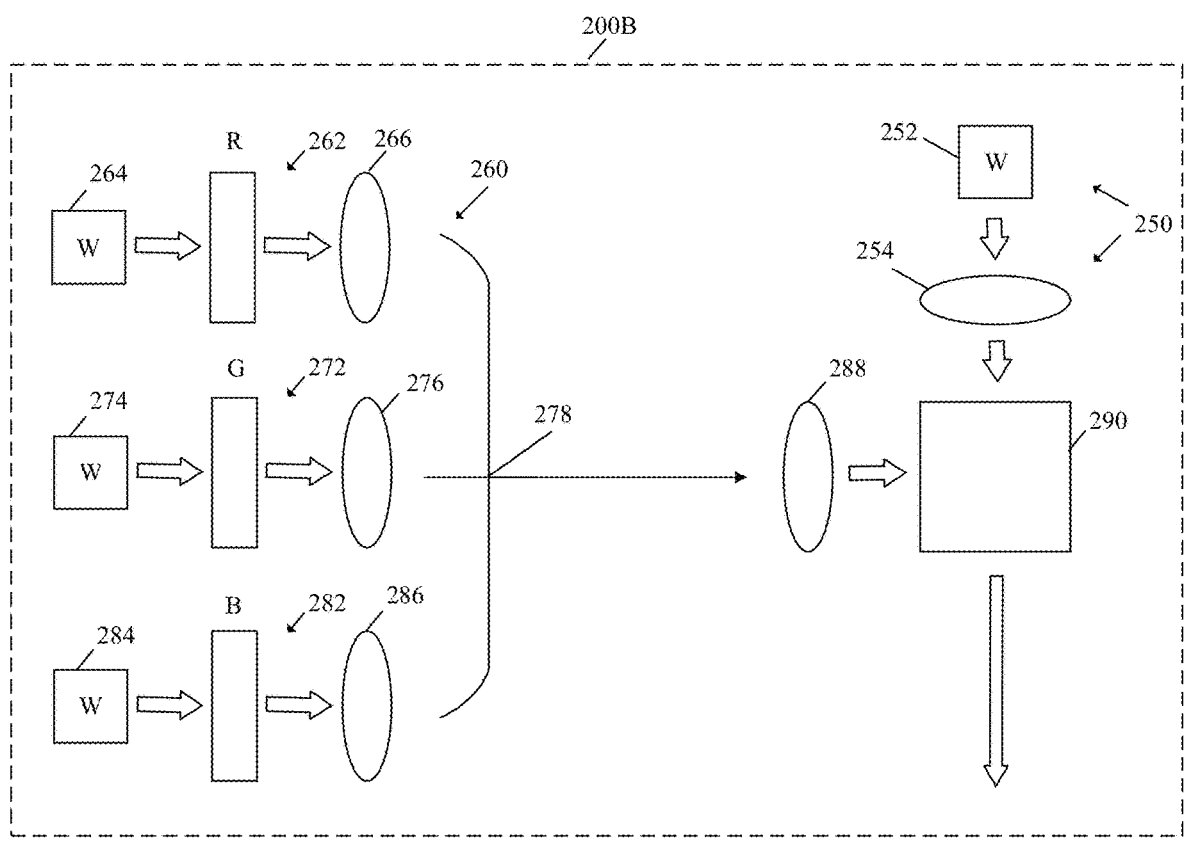
FIG. 2B is a block diagram of a light source configured to generate light for use in color imaging of samples, under an embodiment.

FIG. 2B is a block diagram of a light source 200B configured to generate light for use in color imaging of samples, under an embodiment. The light source 200B is used as the light source 102 in the EO system 100 (FIG. 1), but is not so limited. The light source 200B includes a white light subsystem 250 configured for imaging a sample, and a colored light subsystem 260 configured for reimaging the sample, as described in detail herein. The colored light subsystem 260 is configured to provide an RGB color spectra that matches that of the human eye and provides natural looking images. This light source 200B provides relatively fast switching between the light sources so that the four colors (RGBW) can be taken sequentially during a scan.

The white light subsystem 250 comprises a white light source 252 optically coupled to an input of an optical device 290. The optical device 290 of an embodiment includes a beam splitter, for example, but is not so limited. An embodiment includes a lens 254 configured to couple the output of the white light source 252 to the optical device 290 input, but is not so limited. The white light subsystem 250 includes a very bright, wide area white LED for fast, uniform surface profile scans over large z range, but is not so limited. The EO system 100 is configured to control the optical device 290 to output the white light from the white light subsystem 250 for use in imaging operations described herein.

The colored light subsystem 260 comprises a first optical path 262 including a white light source 264 optically coupled to a first color filter R (e.g., red), a second optical path 272 including a white light source 274 optically coupled to a second color filter G (e.g., green), and a third optical path 282 including a white light source 284 optically coupled to a third color filter B (e.g., blue). An optical bundle 278 or coupler is configured to optically couple the outputs of the three color filters RGB to an input of the optical device 290. An embodiment includes lenses 266-276-286 configured to couple each of the colored light outputs into the optical bundle, and/or a lens 288 configured to couple the output of the optical bundle to the optical device, but is not so limited. The EO system 100 is configured to control the optical device 290 to output the colored light from the colored light subsystem 260 for use in reimaging operations described herein.

Figure 3:
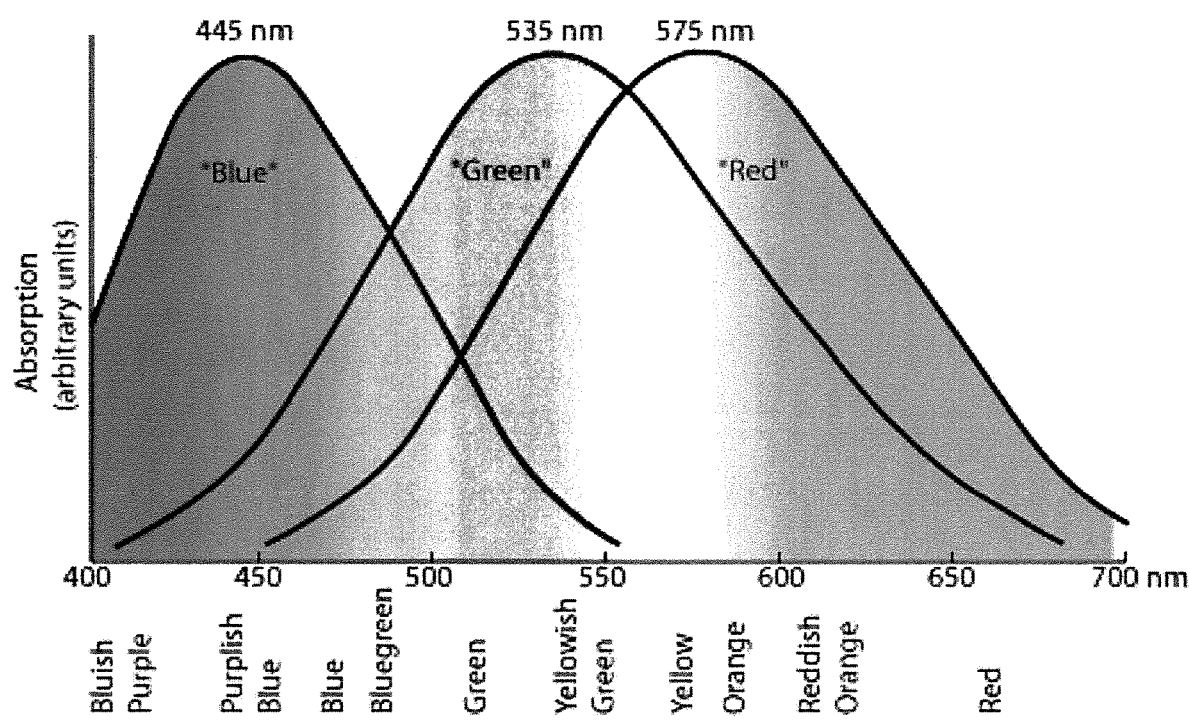
FIG. 3 shows response curves for the three different types of cones in the retina mimicked by the color filters, under an embodiment.

The color filters of an embodiment are configured to closely mimic the color response of the human eye when convolved with the response of the CCD camera. The retina of the human eye contains three types of color-sensitive cones, corresponding approximately to red, green, and blue sensitive detectors. For an object or image to be seen in color, at least two kinds of cones must be triggered, and the perceived color is based on the relative level of excitation of the different cones. When light strikes a cone it interacts with a visual pigment, and three different kinds of pigments respond to short (blue), medium (green), and long (red) wavelengths of light and lead to three response curves, the shapes of which are obtained by measurement of the absorption by the cones. FIG. 3 shows response curves for the three different types of cones in the retina mimicked by the EO system color filters, under an embodiment.

Figure 4:
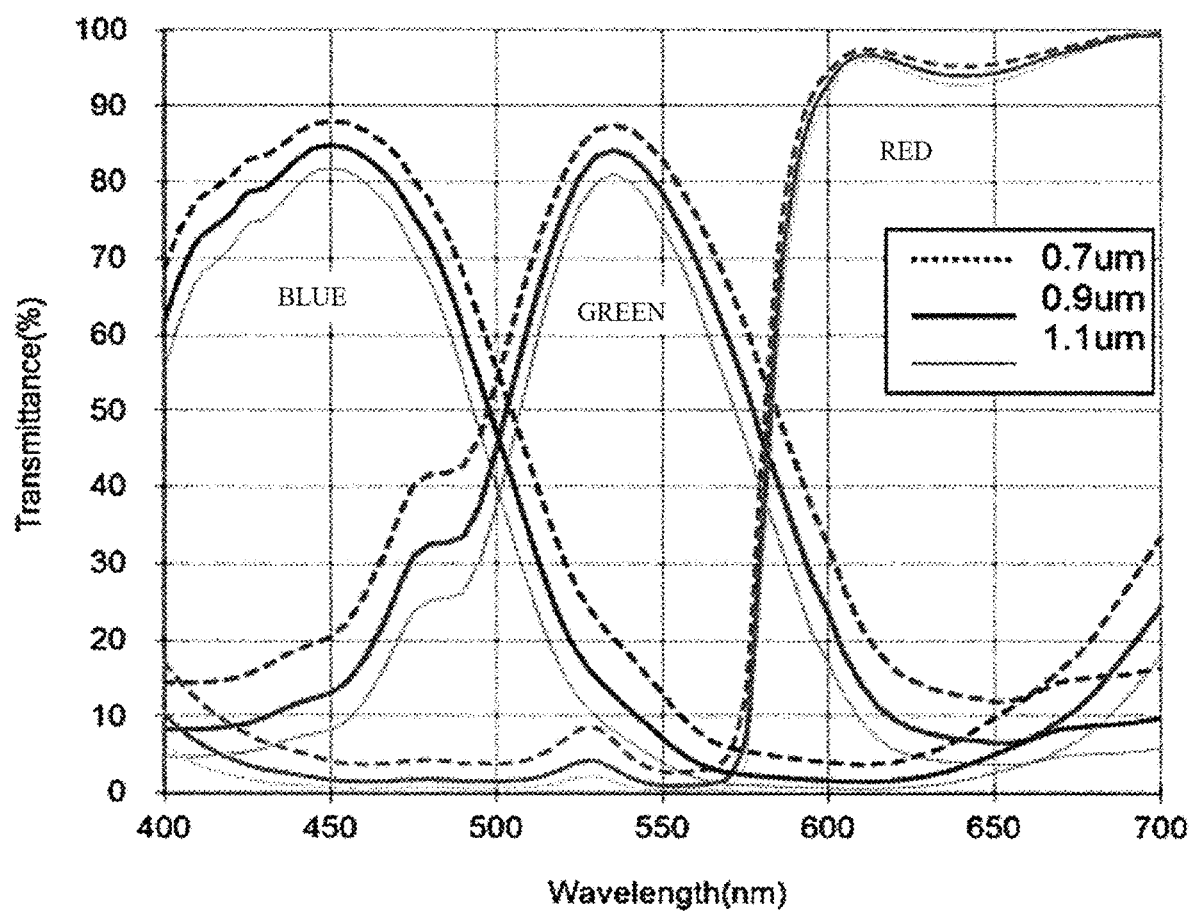
FIG. 4 shows a representative transmission curve for the Color Mosaic® primary color filter used as color filters in the EO system, under an embodiment.

The color filter materials of an embodiment include pigmented, negative tone, photosensitive imaging materials used to produce color filter arrays and pattern color filter arrays for image sensor applications. An example of a primary (RGB) color filter for semiconductor image sensor applications of an embodiment includes the Color Mosaic® available from Fujifilm, but the embodiments are not limited to using this material. FIG. 4 shows a representative transmission curve for the Color Mosaic® primary color filter used as color filters in the EO system, under an embodiment. This transmission curve very closely approximates the response curves of the human retina.

Figure 5:
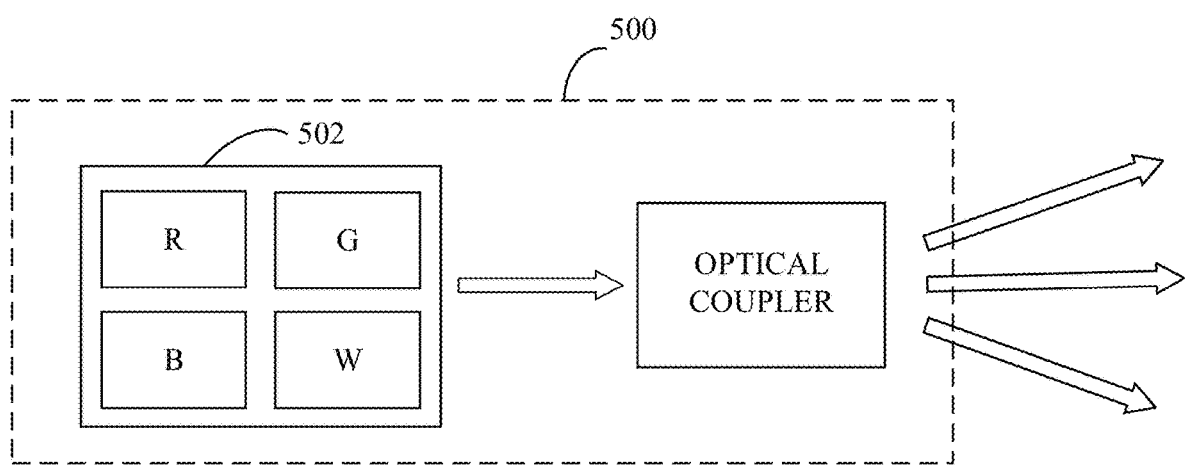
FIG. 5 is a block diagram of a light source of an EO system configured to generate color images of a sample, under an alternative embodiment.

As another example source of colored light, FIG. 5 is a block diagram of a light source 500 of an EO system configured to generate colored light for use in color imaging of samples, under an alternative embodiment. The light source 500 is used as the light source 102 in the EO system 100, but is not so limited. The light source 500 includes a multi-light emitting diode (LED) module 502 comprising, for example, red (R), blue (B), green (G), and white (W) emitters. Examples of multi-LED modules include the SBM-40-LC available from Luminus Devices, Inc., and the Luxeon Rebel Color Portfolio emitters available from Philips Lumileds Lighting Company, but the embodiments are not limited to using these emitters. An optical coupler 504 is included to couple the outputs of the multi-LED module emitters 502 to the EO system 100 optical path. The EO system is configured to automatically control selection of an emitter (red, green, blue, white) coupled as the input to the optical path according to an imaging or data collection profile, as described in detail herein. While the embodiments of the EO system 100 described herein are configured to use light source 200 or light source 500, the descriptions that follow assume use of the light source 200 with the color filter. However, the embodiments are not limited to the color filter and can alternatively use colored emitters to generate the white and/or non-white light.

The EO system is configured to use the light source 200 to generate or output a color image from B&W image sensor data by imaging the sample with RGB (red, green, blue) source light (non-white light) generated when each of the filters (e.g., red light, green light, blue light) is separately illuminated by a white light source. An initial imaging operation is performed in which surface profile information or data is generated when the sample is imaged at a high speed using high intensity white light to determine in-focus height (z-value) for each pixel location (x-y), and hence a "z-band" or range of z-values that includes the in-focus z-values for all imaged pixels. The sample is then reimaged by separately obtaining data with one or more different colored light sources. The vertical scan rate used in the reimaging of an embodiment is slower than the scan rate used during the initial scanning operation, but embodiments are not so limited. The vertical image scan can be repeated over the entire z-value scanning range using each light color or, alternatively, color images can be obtained over a predetermined band of z-values, for example in a band of z-values selected or generated to include the optimal z-values of all pixels.

In an embodiment, for example, the reimaging operation comprises rescanning the sample using the light sequence W-R-G-B over the z-band of surface heights and acquiring image (CCD) frames. Including the white-light source in the scan sequence configures the EO system to more accurately correlate the height profile of the sample with the RGB matrix, in the event a mechanical z-offset exists between the first and second scans. The rescanning operation is performed at a relatively slower speed than the initial scan, and operates the white-light source at a reduced intensity that is similar or comparable to the RGB light source intensity because the RBG light sources are dimmer than the full-intensity white-light source, but embodiments are not so limited.

More particularly, the initial B&W imaging involves scanning the sample using white light by changing the measurement beam path length (z-axis) relative to the reference beam. Each pixel of the sensor samples a corresponding pixel within the image of the sample surface, and an interference signal of varying value is produced as the length of the reference or measurement arm is scanned by a positioning stage through a path length. The interference signal of a pixel has maximum modulation or maximum value when the optical path length of light impinging on the pixel is exactly the same for the reference and the object beams. Therefore, the z-value (height) for the point on the surface imaged by this pixel corresponds to the z-value of the objective (relative to sample) when the modulation of the interference signal is greatest. During the scanning operation a matrix is generated including each pixel or pixel position (x-y) on the sample surface along with the corresponding modulation values of the interference signals over the vertical (z-value) scan range. From the modulation data in the matrix, an optimal in-focus z-value is determined for each pixel, as the z-value at which the modulation signal is greatest. This set of optimal z-values represents the surface height information at each pixel location on the surface. Thus, the set of optimal z-values, together with the corresponding pixel location (x-y), describe the surface topography of the sample.

Following imaging of the sample and generation of the data matrix with the height data (z-axis) per pixel position sampled on the surface, the sample is reimaged. Generally, the reimaging includes reimaging the sample with each of the light colors white, red, blue, and/or green to obtain reimaging data with white and colored light. Alternatively, the reimaging includes reimaging the sample with each of the light colors red, green, and blue to obtain reimaging data with the colored light. As described above, the reimaging of an embodiment includes reimaging the sample with white, red, green, and blue light. The reimaging involves determining from the initial imaging matrix each pixel location (x-y) and the corresponding optimal (in-focus) z-value. The sample is then reimaged with each light color at the corresponding optimal z-value or band of optimal z-values (corresponding to all image pixels). For example, using the optimal z-band, the sample is separately imaged using the filtered light source 200 (red, green, blue filters) but is not so limited. Regardless of whether the reimaging comprises scanning the entire vertical band or the optimal z-band, the reimaging includes reimaging with all light sources (W-R-G-B, or R-G-B) sequentially at each vertical sampling point or, alternatively, reimaging over the entire vertical band with each of the light sources.

Figure 6:
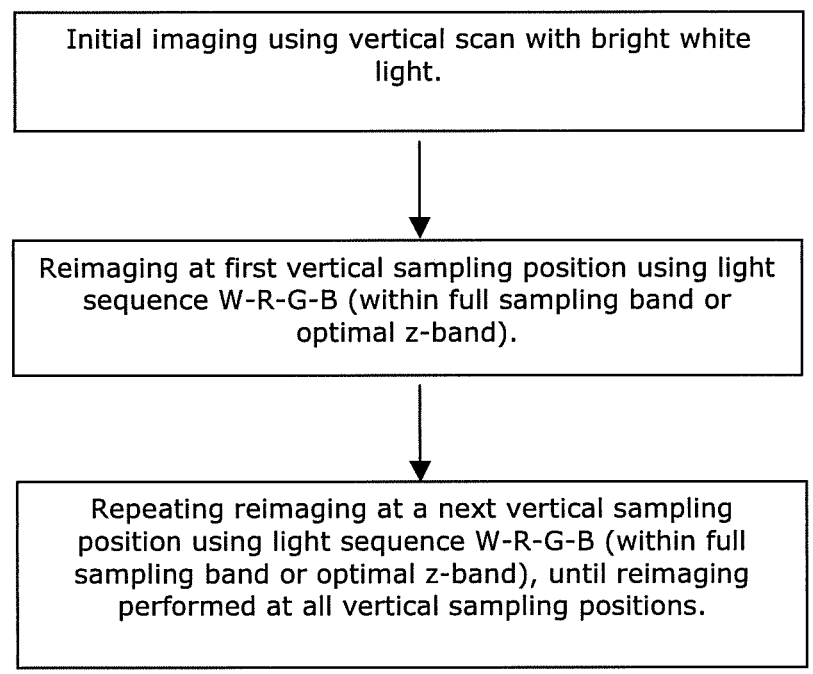
FIG. 6 is an example flow diagram for generating color images or maps of the actual sample or sample surface, under an embodiment.

The reimaging of an embodiment includes reimaging at each vertical sampling position by sequentially cycling through each of the four light colors (W-R-G-B). FIG. 6 is an example flow diagram 600 for generating color images or maps of the actual sample or sample surface, under an embodiment. Under this reimaging process, a reimaging sequence is executed at a first vertical sampling point. The reimaging sequence comprises sequentially imaging using a sequence of the light colors, for example, sequentially imaging using the color light sequence W-R-G-B. Alternatively, the reimaging sequence comprises sequentially imaging using the color light sequence R-G-B. The reimaging sequence (W-R-G-B, or R-G-B) is then executed at a next subsequent vertical sampling point, and this process is repeated until the reimaging sequence has been executed all vertical sampling points (e.g., optimal z-band, full z-band, etc.). The white light of this reimaging operation, when used, is operated at a reduced intensity relative to the intensity used in the initial imaging operation, but is not so limited. Upon completion of the reimaging process, four different color images (white, red, green, blue) have been obtained at each vertical scanning location corresponding to all pixels in the matrix. The reimaging of this embodiment is not limited to using the light sequence described, and alternatively can use a different light color sequence.

Figure 7:
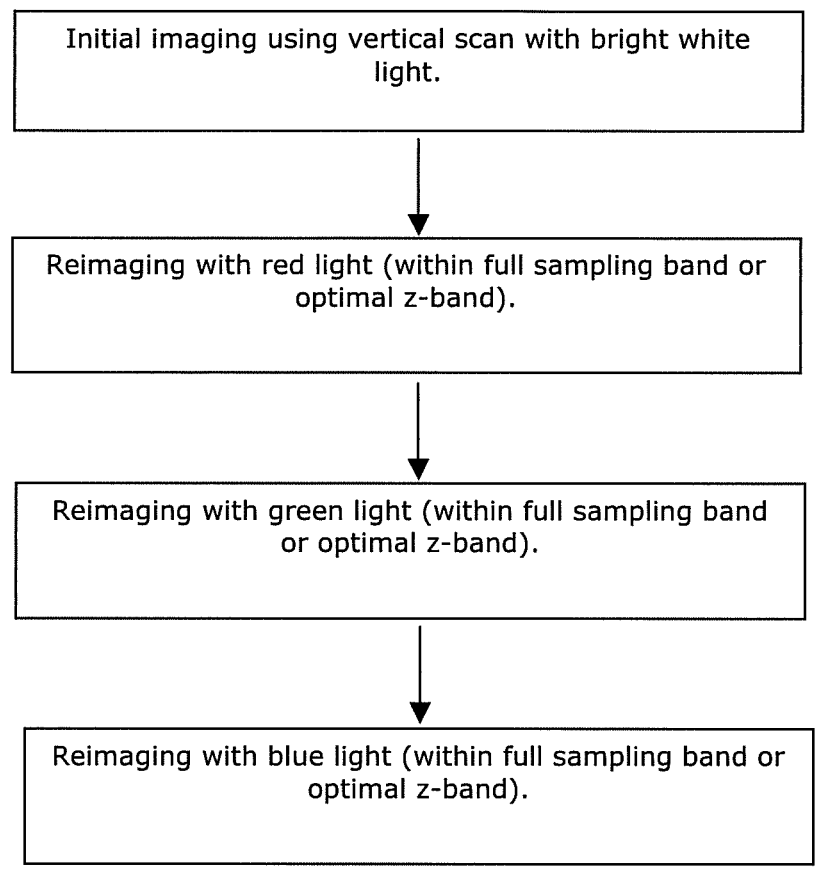
FIG. 7 is an example flow diagram for generating color images or maps of the actual sample or sample surface, under an alternative embodiment.

In an embodiment, the reimaging generally comprises three reimaging sequences, with each reimaging sequence directed to capturing an image using a particular light color (red, green, blue). FIG. 7 is an example flow diagram 700 for generating color images or maps of the actual sample or sample surface, under an alternative embodiment. Under this reimaging process, a first reimaging sequence is executed in which images are captured by performing the vertical scan (z-value scan) with the red filter (red light) in place. Subsequent to completion of the first reimaging sequence, a second reimaging sequence is executed in which images are captured by performing a z-value scan with the green filter (green light) in place. Subsequent to completion of the second reimaging sequence, a third reimaging sequence is executed in which images are captured by performing a z-value scan with the blue filter (blue light) in place. Upon completion of the three reimaging sequences, three different color images (red, green, blue) have been obtained corresponding to all pixels in the matrix. The reimaging process is not limited to this sequence of colors, however, so the sample can be reimaged using any sequence of the filter colors, or any different sequence of filter colors at any sampling position.

Figure 8:
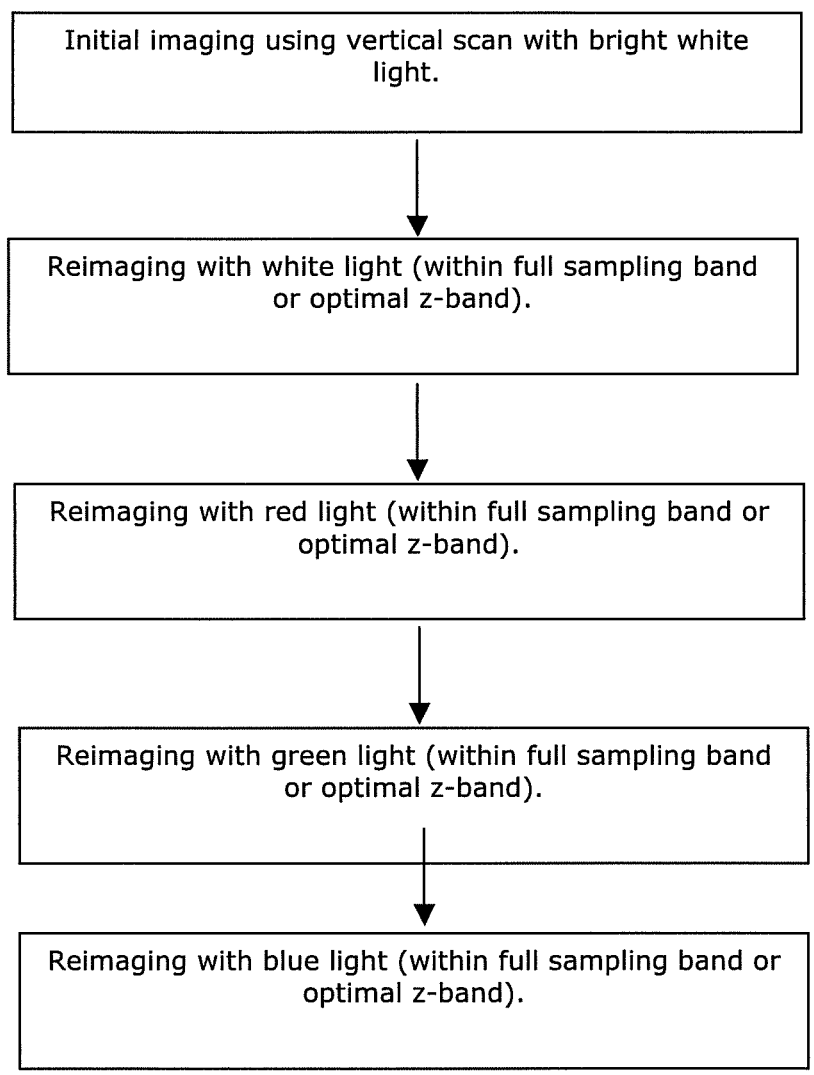
FIG. 8 is an example flow diagram for generating color images or maps of the actual sample or sample surface, under another alternative embodiment.

For example, an alternative embodiment can include four reimaging sequences including reimaging at the sampling position with white light as well as red, green, and blue light. FIG. 8 is an example flow diagram 800 for generating color images or maps of the actual sample or sample surface, under another alternative embodiment. Under this reimaging process, a first reimaging sequence is executed in which images are captured by performing the vertical scan (z-value scan) with the white light. The white light of this reimaging operation is operated at a reduced intensity relative to the intensity used in the initial imaging operation, but is not so limited. Subsequent to completion of the first reimaging sequence, a second reimaging sequence is executed in which images are captured by performing the vertical scan (z-value scan) with the red filter (red light) in place. Subsequent to completion of the second reimaging sequence, a third reimaging sequence is executed in which images are captured by performing a z-value scan with the green filter (green light) in place. Subsequent to completion of the third reimaging sequence, a fourth reimaging sequence is executed in which images are captured by performing a z-value scan with the blue filter (blue light) in place. Upon completion of the four reimaging sequences, four different color images (white, red, green, blue) have been obtained corresponding to all pixels in the matrix. The reimaging process is not limited to this sequence of colors, however, and is not limited to four reimaging scans, so the sample can be reimaged using any different sequence of light colors using another number of reimaging scans.

The images of the acquisition sequences described herein (e.g., W-R-G-B, R-G-B, etc.) for any embodiment are acquired or taken while the scan is paused to take each frame (i.e., scan movement only happens between frames). Alternatively, the images of the acquisition sequences (e.g., W-R-G-B, R-G-B, etc.) are taken during a constant scan motion, in which case the z-location of each of the different color images is offset slightly from at least one preceding color image (e.g., by approximately 10 nm). This amount of offset is inconsequential in determining the color at the z-location (e.g., depth-of-field of even 100× magnification objectives is on the order of 500 nm), and the offset in the surface height, as determined by the W data, is minimized in an embodiment by grouping the colors in a sequence. An example sequence comprises the color sequence (B-W-R-G)-(B-W-R-G)-(B-W-R-G)-(B-W-R-G), but embodiments are not so limited as this is only one example grouping. The offset can also be nearly eliminated by finding the surface height for each color by separately fitting each color when the host EO instrument has sufficient z-accuracy. Additionally, the reimaging is not limited to reimaging over the entire z-value scan range, but can instead involve repeating the vertical scan operation with each different light color over a reduced range of z-values. Furthermore, the reimaging process is not limited to following the same sequence of sampling positions as any preceding imaging or reimaging process.

As an example of scanning over a reduced or limited range of z-values, the reimaging comprising performing color scanning at the sampling location over a vertical band generated to include the optimal (in-focus) z-values of all pixel positions. Under these embodiments, following generation of the sampling data matrix with the z-value data per pixel position, the EO system is configured to determine from the initial imaging matrix a scanning height band, or range of z-values, that includes the optimal or in-focus z-values for all pixel positions. The sample is then reimaged with each light color using the optimal z-value sampling band. For example, using the optimal z-value sampling band, the sample is separately scanned or imaged using the filtered light source 200 (red, green, blue filters) but is not so limited.

Figure 9:
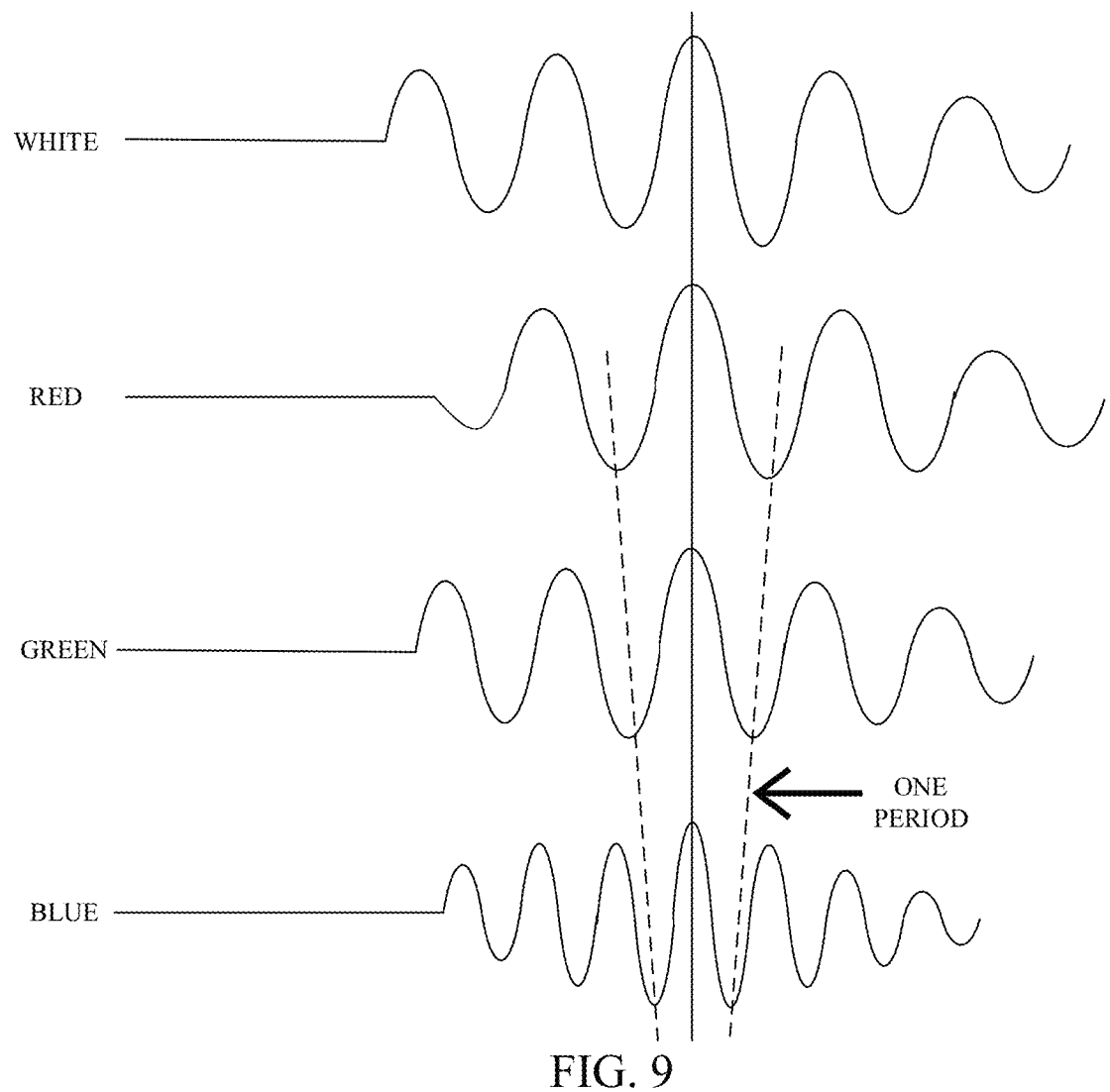
FIG. 9 is an example of VSI intensity envelopes for imaging colors (WRGB) with one oscillation period indicated, under an embodiment.

When determining a range or band of values for reimaging scans used in vertical scanning interferometry operations, it is considered that interference oscillations occur for all colors when scanning near the surface (focus) location, and therefore a correlogram is superimposed on the graph of intensity versus z-value for each color. The true (interference free) intensity for each color is found by averaging the intensity of each color over a fixed z-scan range, chosen to include an integer number of correlogram oscillation periods. The integer number used in an embodiment is one, for example, but is not so limited. FIG. 9 is an example of VSI intensity envelopes for imaging colors (WRGB) with one oscillation period indicated, under an embodiment. The z-scan range or distance is then determined from a wavelength in the wavelength interval of the respective color spectrum (e.g., wavelength at central frequency), but the embodiment is not so limited. The z-scan range or band may be increased by an amount that includes an additional variance to account for any uncertainty in actual position of optimal (in-focus) z-value, but is not so limited. The z-scan range, once determined, is centered on the surface height (as determined using the white-light data) and used in the reimaging operations described in detail herein.

The reimaging of an example embodiment therefore comprises a single reimaging scan in which three separate color scans, with each of three different light colors (red, green, blue), are obtained in sequence over the optimal z-value sampling band. More particularly, the reimaging involves positioning the objective at the sampling position and reimaging over the optimal z-value sampling band with the red filter (red light) in place, and then reimaging over the optimal z-value sampling band with the green filter (green light) in place, and then reimaging over the optimal z-value sampling band with the blue filter (blue light) in place. The reimaging process is not limited to this sequence of colors, however, so the sample can be reimaged using any sequence of the filter colors, or any different sequence of filter colors at any sampling position. Furthermore, the reimaging process is not limited to following the same sequence of sampling positions as any preceding imaging or reimaging process.

Embodiments include a system comprising a light source configured to selectively output light. The system includes an optical objective configured to couple the light from the light source to a sample under measurement when present, and direct reflected light from the sample. The system includes a controller configured to automatically control a color of the output light and a vertical position of the optical objective relative to the sample. The color is selected from a plurality of colors. The vertical position includes a range of vertical positions scanned by the objective. The system includes a detector configured to receive the reflected light and to detect focus, and output data representing a surface profile of the sample. The data includes color images of the surface profile.

Embodiments include a system comprising: a light source configured to selectively output light; an optical objective configured to couple the light from the light source to a sample under measurement when present, and direct reflected light from the sample; a controller configured to automatically control a color of the output light and a vertical position of the optical objective relative to the sample, wherein the color is selected from a plurality of colors, wherein the vertical position includes a range of vertical positions scanned by the objective; and a detector configured to receive the reflected light and to detect focus, and output data representing a surface profile of the sample, wherein the data includes color images of the surface profile.

The plurality of light colors includes at least one of white, red, green, and blue.

The light source comprises a white light and a filter component, wherein the filter component comprises a plurality of color filters.

The plurality of color filters is configured to mimic a color response of a human eye.

The plurality of color filters includes at least one of a red filter, a green filter, and a blue filter.

The light source is configured to illuminate a color filter positioned in the optical path.

The controller is configured to control the color of the output light by selectively controlling a relative position between the white light and the plurality of color filters.

The controller is configured to control the color of the output light by selectively controlling a position of a color filter of the plurality of color filters in the optical path.

The light source comprises a white light subsystem and a colored light subsystem.

The controller is configured to selectively control the output light to be light output by one of the white light subsystem and the colored light subsystem.

The white light subsystem comprises a white light configured to form a first optical path with a first input of an optical device.

The system includes a lens in the first optical path.

The colored light subsystem comprises a plurality of light sources configured to form a second optical path with a second input of the optical device, wherein the colored light subsystem is configured to output light having a plurality of light colors.

The second optical path includes an optical coupler comprising a plurality of input branches and an output branch.

The plurality of light sources includes a plurality of lights, wherein each light of the plurality of lights is coupled to an input branch of the plurality of input branches.

The plurality of lights include a plurality of colored lights, wherein the plurality of colored lights includes at least one of a white light, a red light, a green light, and a blue light.

Each input branch is coupled to a different colored light of the plurality of colored lights.

The controller is configured to control the color of the light at the output branch by selectively controlling a state of the plurality of colored lights.

The plurality of light sources comprises a multi-light emitting diode (LED) module including a plurality of colored emitters.

The plurality of lights include a plurality of white lights, wherein a white light is coupled to each input branch of the plurality of input branches.

The system includes a plurality of color filters, wherein a color filter is positioned between each input branch and the corresponding white light.

The plurality of color filters includes at least one of a red filter, a green filter, and a blue filter.

The controller is configured to control the color of the light at the output branch by selectively controlling a state of the plurality of white lights.

The system includes a plurality of input lenses, wherein an input lens of the plurality of input lenses is positioned between each color filter and the input branch corresponding to the color filter.

The system includes an output lens positioned between an output of the output branch and the second input of the optical device.

The optical device comprises at least one of a plurality of mirrors, a beamsplitter, a reflector, and an off-axis reflector.

The controller is configured to control an imaging operation using the plurality of colors of output light.

The imaging operation comprises vertical scanning interferometry.

The imaging operation comprises an imaging sequence over a first vertical scan range at a first scan speed, wherein the imaging sequence includes imaging with white output light.

The imaging operation comprises a reimaging sequence over a second vertical scan range at a second scan speed, wherein the reimaging sequence includes reimaging with the plurality of colors of output light.

The reimaging sequence comprises a repeating sequence of red-green-blue light.

The reimaging sequence comprises a repeating sequence of white-red-green-blue light.

The reimaging sequence comprises a repeating sequence of blue-white-red-green light.

The second scan speed is slower than the first scan speed.

The second vertical scan range is shorter than the first vertical scan range.

The second vertical scan range is configured to include optimal in-focus vertical positions corresponding to a plurality of pixels of a surface of the sample when present.

The optimal in-focus vertical positions are determined using data of the imaging sequence.

The second vertical scan range is determined using a wavelength of a spectrum corresponding to a color of light used for the corresponding reimaging sequence.

The second vertical scan range includes an integer number of oscillation periods at the wavelength.

The second vertical scan range includes an additional variance, wherein the variance is configured to account for uncertainty in actual position of the optimal in-focus vertical positions.

The second vertical scan range is centered on a surface height determined during the imaging sequence.

The reimaging sequence comprises reimaging with the plurality of colors of output light at each of a plurality of vertical positions in the second vertical scan range.

The reimaging sequence comprises a plurality of reimaging sequences, wherein each reimaging sequence of the plurality of reimaging sequences includes reimaging using the plurality of colors of output light at each vertical scan position.

The reimaging sequence comprises, at a vertical position of the plurality of vertical positions, sequentially reimaging using each color of the plurality of colors of output light.

The reimaging sequence comprises, at a next vertical position of the plurality of vertical positions, sequentially reimaging using each color of the plurality of colors of output light.

The plurality of colors of output light includes red light, green light, and blue light.

The plurality of colors of output light includes white light.

An intensity of the white light of the reimaging sequence is reduced relative to the intensity of the imaging sequence.

The reimaging sequence comprises a plurality of reimaging sequences, wherein each reimaging sequence of the plurality of reimaging sequences includes reimaging over the second vertical scan range with each color of the plurality of colors of output light.

The reimaging sequence comprises sequentially reimaging the plurality of vertical positions in the second vertical scan range using a first color of the plurality of colors of output light.

The reimaging sequence comprises sequentially reimaging the plurality of vertical positions in the second vertical scan range using a second color of the plurality of colors of output light, wherein the second color is different from the first color.

The plurality of colors of output light includes red light, green light, and blue light.

The plurality of colors of output light includes white light.

An intensity of the white light of the reimaging sequence is reduced relative to the intensity of the imaging sequence.

A scan of the reimaging sequence is paused at each vertical position to acquire an image at the vertical position.

A scan of the reimaging sequence is a constant scan, wherein image acquisition occurs during the scan.

The reimaging sequence comprises reimaging with a sequence of the plurality of colors of output light, wherein the sequence minimizes a height offset between an image and at least one preceding color image.

The sequence comprises a sequence of blue-white-red-green light.

The sequence is a repeating sequence.

The optical objective includes an interference configuration for non-contact optical measurements of the sample when present.

The optical objective includes a beam-splitter and a reference mirror.

The interference objective includes at least one of a Mirau objective and a Michelson objective.

The controller is configured to control a focus search using vertical scanning and data collection at each of a plurality of pixels of a surface of the sample when present The detector is configured to generate the data representing the surface profile by generating a plurality of measurement maps including data of the plurality of pixels.

The plurality of measurement maps comprises a plurality of measurement maps at a plurality of discrete wavelengths.

The detector is configured to stack the plurality of measurement maps.

The detector is configured to determine a focus peak curve for the plurality of pixels.

The detector is configured to determine a best focus position at each of the plurality of pixels.

The controller is coupled to the optical objective and configured to control focus by controlling a vertical position of the optical objective relative to the sample.

An optical director configured to at least one of couple light from the light source to the optical objective and couple reflected light from the sample when present to the detector.

The optical director comprises at least one of a plurality of mirrors, a beamsplitter, a reflector, and an off-axis reflector.

The system includes a condensing device positioned between the light source and the optical director.

The system includes a collimator device positioned between the condensing device and the optical director.

The system includes at least one aperture positioned between the light source and the optical director.

Embodiments include a method comprising configuring an optical objective to couple output light from a light source to a sample under measurement when present, and direct reflected light from the sample. The method includes configuring a controller to automatically control a color of the output light by selecting the color from a plurality of colors. The method includes configuring the controller to automatically control a vertical position of the optical objective relative to the sample. The vertical position includes a range of vertical positions scanned by the objective. The method includes configuring a detector to receive the reflected light and to detect focus, and to output data representing a surface profile of the sample. The data includes color images of the surface profile.

Embodiments include a method comprising: configuring an optical objective to couple output light from a light source to a sample under measurement when present, and direct reflected light from the sample; configuring a controller to automatically control a color of the output light by selecting the color from a plurality of colors; configuring the controller to automatically control a vertical position of the optical objective relative to the sample, wherein the vertical position includes a range of vertical positions scanned by the objective; and configuring a detector to receive the reflected light and to detect focus, and to output data representing a surface profile of the sample, wherein the data includes color images of the surface profile.

Embodiments include a method comprising controlling an optical objective to couple output light from a light source to a sample under measurement, and direct reflected light from the sample. The method includes automatically controlling a color of the output light by selecting the color from a plurality of colors. The method includes automatically controlling a vertical position of the optical objective relative to the sample. The vertical position includes a range of vertical positions scanned by the objective. The method includes receiving the reflected light at a detector and detecting focus. The method includes outputting data representing a surface profile of the sample. The data includes color images of the surface profile.

Embodiments include a method comprising: controlling an optical objective to couple output light from a light source to a sample under measurement, and direct reflected light from the sample; automatically controlling a color of the output light by selecting the color from a plurality of colors; automatically controlling a vertical position of the optical objective relative to the sample, wherein the vertical position includes a range of vertical positions scanned by the objective; receiving the reflected light at a detector and detecting focus; and outputting data representing a surface profile of the sample, wherein the data includes color images of the surface profile.

The plurality of light colors includes at least one of white, red, green, and blue.

The light source comprises a white light and a filter component, wherein the filter component comprises a plurality of color filters.

The plurality of color filters mimics a color response of a human eye.

The plurality of color filters includes at least one of a red filter, a green filter, and a blue filter.

The method includes illuminating with the light source a color filter positioned in the optical path.

The controlling the color of the output light comprises selectively controlling a relative position between the white light and the plurality of color filters.

The controlling the color of the output light comprises selectively controlling a position of a color filter of the plurality of color filters in the optical path.

The method includes selectively controlling the output light to be light output by one of a white light subsystem and a colored light subsystem.

The white light subsystem comprises a white light forming a first optical path with a first input of an optical device.

The colored light subsystem comprises a plurality of light sources forming a second optical path with a second input of the optical device, wherein the colored light subsystem outputs light having a plurality of light colors.

The second optical path includes an optical coupler comprising a plurality of input branches and an output branch.

The plurality of light sources includes a plurality of lights, wherein each light of the plurality of lights is coupled to an input branch of the plurality of input branches.

The plurality of lights include a plurality of colored lights, wherein the plurality of colored lights includes at least one of a white light, a red light, a green light, and a blue light.

Each input branch is coupled to a different colored light of the plurality of colored lights.

The method includes controlling the color of the light at the output branch by selectively controlling a state of the plurality of colored lights.

The plurality of light sources comprises a multi-light emitting diode (LED) module including a plurality of colored emitters.

The plurality of lights include a plurality of white lights, wherein a white light is coupled to each input branch of the plurality of input branches.

The method includes positioning a color filter of a plurality of color filters between each input branch and the corresponding white light.

The plurality of color filters includes at least one of a red filter, a green filter, and a blue filter.

The method includes controlling the color of the light at the output branch by selectively controlling a state of the plurality of white lights.

The method includes positioning an input lens of a plurality of input lenses between each color filter and the input branch corresponding to the color filter.

The method includes positioning an output lens between an output of the output branch and the second input of the optical device.

The optical device comprises at least one of a plurality of mirrors, a beamsplitter, a reflector, and an off-axis reflector.

The method includes controlling an imaging operation using the plurality of colors of output light.

The imaging operation comprises vertical scanning interferometry.

The imaging operation comprises an imaging sequence over a first vertical scan range at a first scan speed, wherein the imaging sequence includes imaging with white output light.

The imaging operation comprises a reimaging sequence over a second vertical scan range at a second scan speed, wherein the reimaging sequence includes reimaging with the plurality of colors of output light.

The reimaging sequence comprises a repeating sequence of red-green-blue light.

The reimaging sequence comprises a repeating sequence of white-red-green-blue light.

The reimaging sequence comprises a repeating sequence of blue-white-red-green light.

The second scan speed is slower than the first scan speed.

The second vertical scan range is shorter than the first vertical scan range.

The second vertical scan range includes optimal in-focus vertical positions corresponding to a plurality of pixels of a surface of the sample when present.

The method includes determining the optimal in-focus vertical positions using data of the imaging sequence.

The method includes determining the second vertical scan range using a wavelength of a spectrum corresponding to a color of light used for the corresponding reimaging sequence.

The second vertical scan range includes an integer number of oscillation periods at the wavelength.

The second vertical scan range includes an additional variance, wherein the variance accounts for uncertainty in actual position of the optimal in-focus vertical positions.

The second vertical scan range is centered on a surface height determined during the imaging sequence.

The reimaging sequence comprises reimaging with the plurality of colors of output light at each of a plurality of vertical positions in the second vertical scan range.

The reimaging sequence comprises a plurality of reimaging sequences, wherein each reimaging sequence of the plurality of reimaging sequences includes reimaging using the plurality of colors of output light at each vertical scan position.

The reimaging sequence comprises, at a vertical position of the plurality of vertical positions, sequentially reimaging using each color of the plurality of colors of output light.

The reimaging sequence comprises, at a next vertical position of the plurality of vertical positions, sequentially reimaging using each color of the plurality of colors of output light.

The plurality of colors of output light includes red light, green light, and blue light.

The plurality of colors of output light includes white light.

The method includes reducing an intensity of the white light of the reimaging sequence relative to the intensity of the imaging sequence.

The reimaging sequence comprises a plurality of reimaging sequences, wherein each reimaging sequence of the plurality of reimaging sequences includes reimaging over the second vertical scan range with each color of the plurality of colors of output light.

The reimaging sequence comprises sequentially reimaging the plurality of vertical positions in the second vertical scan range using a first color of the plurality of colors of output light.

The reimaging sequence comprises sequentially reimaging the plurality of vertical positions in the second vertical scan range using a second color of the plurality of colors of output light, wherein the second color is different from the first color.

The plurality of colors of output light includes red light, green light, and blue light.

The plurality of colors of output light includes white light.

The method includes reducing an intensity of the white light of the reimaging sequence relative to the intensity of the imaging sequence.

The method includes pausing a scan of the reimaging sequence at each vertical position to acquire an image at the vertical position.

A scan of the reimaging sequence is a constant scan, wherein image acquisition occurs during the scan.

The reimaging sequence comprises reimaging with a sequence of the plurality of colors of output light, wherein the sequence minimizes a height offset between an image and at least one preceding color image.

The sequence comprises a sequence of blue-white-red-green light.

The sequence is a repeating sequence.

The optical objective includes an interference configuration for non-contact optical measurements of the sample when present.

The optical objective includes a beam-splitter and a reference mirror.

The interference objective includes at least one of a Mirau objective and a Michelson objective.

The method includes controlling a focus search using vertical scanning and data collection at each of a plurality of pixels of a surface of the sample when present The method includes generating the data representing the surface profile by generating a plurality of measurement maps including data of the plurality of pixels.

The plurality of measurement maps comprises a plurality of measurement maps at a plurality of discrete wavelengths.

The method includes stacking the plurality of measurement maps.

The method includes determining a focus peak curve for the plurality of pixels.

The method includes determining a best focus position at each of the plurality of pixels.

The method includes controlling focus by controlling a vertical position of the optical objective relative to the sample.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the EO systems and methods is not intended to be exhaustive or to limit the systems and methods described to the precise form disclosed. While specific embodiments of, and examples for, the EO systems and methods are described herein for illustrative purposes, various equivalent modifications are possible within the scope of other EO systems and methods, as those skilled in the relevant art will recognize. The teachings of the EO systems and methods provided herein can be applied to other processing and measurement systems and methods, not only for the systems and methods described above.

The elements and acts of the various embodiments described above can be combined to provide further embodiments. These and other changes can be made to the EO systems and methods in light of the above detailed description.

In general, in the following claims, the terms used should not be construed to limit the EO systems and methods to the specific embodiments disclosed in the specification and the claims, but should be construed to include all systems and methods that operate under the claims. Accordingly, the EO systems and methods are not limited by the disclosure, but instead the scope of the EO systems and methods is to be determined entirely by the claims.

While certain aspects of the EO systems and methods are presented below in certain claim forms, the inventors contemplate the various aspects of the EO systems and methods in any number of claim forms. Accordingly, the inventors reserve the right to add additional claims after filing the application to pursue such additional claim forms for other aspects of the EO systems and methods.

What is claimed is:

1. A system comprising:
    a light source configured to selectively output light;
    an aperture positioned in an optical path between the light source and the optical objective;
    a collimator lens positioned in the optical path between the aperture and the optical objective;
    an optical objective configured to couple the light from the light source to a sample under measurement when present, and direct reflected light from the sample;
    a detector configured to receive the reflected light and to detect focus, and output data representing a surface profile of the sample, wherein the data includes color images of the surface profile; and
    a controller configured to automatically control a color of the output light and a vertical position of the optical objective relative to the sample, wherein the color is selected from a plurality of colors, wherein the vertical position includes a range of vertical positions scanned by the objective, wherein the controller is configured to control a focus search using vertical scanning and data collection at each of a plurality of pixels in one of the color images of a surface of the sample when present.

2. The system of claim 1, wherein the plurality of colors includes at least one of white, red, green, or blue.

3. The system of claim 1, wherein the light source comprises a white light and a plurality of color filters.

4. The system of claim 3, wherein the plurality of color filters is configured to mimic a color response of a human eye.

5. The system of claim 3, wherein the plurality of color filters includes at least one of a red filter, a green filter, or a blue filter.

6. The system of claim 3, wherein the light source is configured to illuminate one of the color filters positioned in the optical path between the light source and the aperture.

7. The system of claim 6, wherein the controller is configured to control the color of the output light by selectively controlling a relative position between the white light and the plurality of color filters.

8. The system of claim 6, wherein the controller is configured to control the color of the output light by selectively controlling a position of one of the plurality of color filters in the optical path.

9. The system of claim 1, wherein the light source comprises a white light subsystem and a colored light subsystem.

10. The system of claim 9, wherein the controller is configured to selectively control the output light to be light output by one of the white light subsystem or the colored light subsystem.

11. The system of claim 9, wherein the white light subsystem comprises a white light configured to form a first optical path with a first input of an optical device.

12. The system of claim 11, comprising a lens in the first optical path.

13. The system of claim 9, wherein the colored light subsystem comprises a plurality of light sources configured to form a second optical path with a second input of the optical device, wherein the colored light subsystem is configured to output light having a plurality of light colors.

14. The system of claim 13, wherein the second optical path includes an optical coupler comprising a plurality of input branches and an output branch.

15. The system of claim 13, wherein the plurality of light sources include a plurality of lights, wherein each light of the plurality of lights is coupled to an input branch of the plurality of input branches.

16. The system of claim 15, wherein the plurality of lights include a plurality of colored lights, wherein the plurality of colored lights includes at least one of a white light, a red light, a green light, or a blue light.

17. The system of claim 16, wherein each of the input branches is coupled to a different colored light of the plurality of colored lights.

18. The system of claim 16, wherein the controller is configured to control the color of the light at the output branch by selectively controlling a state of the plurality of colored lights.

19. The system of claim 16, wherein the plurality of light sources comprise a multi-light emitting diode (LED) module including a plurality of colored emitters.

20. The system of claim 15, wherein the plurality of lights include a plurality of white lights, wherein a white light is coupled to each input branch of the plurality of input branches.

21. The system of claim 20, comprising a plurality of color filters, wherein one of the color filters is positioned between each of the input branches and the corresponding white light.

22. The system of claim 21, wherein the plurality of color filters includes at least one of a red filter, a green filter, or a blue filter.

23. The system of claim 21, wherein the controller is configured to control the color of the light at the output branch by selectively controlling a state of the plurality of white lights.

24. The system of claim 15, comprising a plurality of input lenses, wherein an input lens of the plurality of input lenses is positioned between a color filter and the input branch corresponding to the color filter.

25. The system of claim 15, comprising an output lens positioned between an output of the output branch and the second input of the optical device.

26. The system of claim 15, wherein the optical device comprises at least one of a plurality of mirrors, a beamsplitter, a reflector, or an off-axis reflector.

27. The system of claim 1, wherein the controller is configured to control an imaging operation using the plurality of colors of output light.

28. The system of claim 27, wherein the imaging operation comprises vertical scanning interferometry.

29. The system of claim 27, wherein the imaging operation comprises an imaging sequence over a first vertical scan range at a first scan speed, wherein the imaging sequence includes imaging with white output light.

30. The system of claim 29, wherein the imaging operation comprises a reimaging sequence over a second vertical scan range at a second scan speed, wherein the reimaging sequence includes reimaging with the plurality of colors of output light.

31. The system of claim 30, wherein the reimaging sequence comprises a repeating sequence of red-green-blue light.

32. The system of claim 30, wherein the reimaging sequence comprises a repeating sequence of white-red-green-blue light.

33. The system of claim 30, wherein the reimaging sequence comprises a repeating sequence of blue-white-red-green light.

34. The system of claim 30, wherein the second scan speed is slower than the first scan speed.

35. The system of claim 30, wherein the second vertical scan range is shorter than the first vertical scan range.

36. The system of claim 30, wherein the second vertical scan range is configured to include optimal in-focus vertical positions corresponding to a plurality of pixels of a surface of the sample when present.

37. The system of claim 36, wherein the optimal in-focus vertical positions are determined using data of the imaging sequence.

38. The system of claim 37, wherein the second vertical scan range is determined using a wavelength of a spectrum corresponding to a color of light used for the corresponding reimaging sequence.

39. The system of claim 38, wherein the second vertical scan range includes an integer number of oscillation periods at the wavelength.

40. The system of claim 36, wherein the second vertical scan range includes an additional variance, wherein the variance is configured to account for uncertainty in actual position of the optimal in-focus vertical positions.

41. The system of claim 36, wherein the second vertical scan range is centered on a surface height determined during the imaging sequence.

42. The system of claim 30, wherein the reimaging sequence comprises reimaging with the plurality of colors of output light at each of a plurality of vertical positions in the second vertical scan range.

43. The system of claim 42, wherein the reimaging sequence comprises a plurality of reimaging sequences, wherein each reimaging sequence of the plurality of reimaging sequences includes reimaging using the plurality of colors of output light at a vertical scan position.

44. The system of claim 43, wherein the reimaging sequence comprises, at a vertical position of the plurality of vertical positions, sequentially reimaging using each color of the plurality of colors of output light.

45. The system of claim 44, wherein the reimaging sequence comprises, at a next vertical position of the plurality of vertical positions, sequentially reimaging using each color of the plurality of colors of output light.

46. The system of claim 45, wherein the plurality of colors of output light includes red light, green light, and blue light.

47. The system of claim 46, wherein the plurality of colors of output light includes white light.

48. The system of claim 47, wherein an intensity of the white light of the reimaging sequence is reduced relative to the intensity of the imaging sequence.

49. The system of claim 42, wherein the reimaging sequence comprises a plurality of reimaging sequences, wherein each reimaging sequence of the plurality of reimaging sequences includes reimaging over the second vertical scan range with each color of the plurality of colors of output light.

50. The system of claim 49, wherein the reimaging sequence comprises sequentially reimaging the plurality of vertical positions in the second vertical scan range using a first color of the plurality of colors of output light.

51. The system of claim 50, wherein the reimaging sequence comprises sequentially reimaging the plurality of vertical positions in the second vertical scan range using a second color of the plurality of colors of output light, wherein the second color is different from the first color.

52. The system of claim 51, wherein the plurality of colors of output light includes red light, green light, and blue light.

53. The system of claim 52, wherein the plurality of colors of output light includes white light.

54. The system of claim 53, wherein an intensity of the white light of the reimaging sequence is reduced relative to the intensity of the imaging sequence.

55. The system of claim 42, wherein a scan of the reimaging sequence is paused at each vertical position to acquire an image at the vertical position.

56. The system of claim 42, wherein a scan of the reimaging sequence is a constant scan, wherein image acquisition occurs during the scan.

57. The system of claim 56, wherein the reimaging sequence comprises reimaging with a sequence of the plurality of colors of output light, wherein the sequence minimizes a height offset between an image and at least one preceding color image.

58. The system of claim 57, wherein the sequence comprises a sequence of blue-white-red-green light.

59. The system of claim 58, wherein the sequence is a repeating sequence.

60. The system of claim 1, wherein the optical objective includes an interference configuration for non-contact optical measurements of the sample when present.

61. The system of claim 60, wherein the optical objective includes a beam-splitter and a reference mirror.

62. The system of claim 60, wherein the interference objective includes at least one of a Mirau objective or a Michelson objective.

63. The system of claim 1, wherein the detector is configured to generate the data representing the surface profile by generating a plurality of measurement maps including data of the plurality of pixels.

64. The system of claim 63, wherein the plurality of measurement maps comprises a plurality of measurement maps at a plurality of discrete wavelengths.

65. The system of claim 64, wherein the detector is configured to stack the plurality of measurement maps.

66. The system of claim 65, wherein the detector is configured to determine a focus peak curve for the plurality of pixels.

67. The system of claim 65, wherein the detector is configured to determine a best focus position at each of the plurality of pixels.

68. The system of claim 1, wherein the controller is coupled to the optical objective and configured to control focus by controlling a vertical position of the optical objective relative to the sample.

69. The system of claim 1, comprising an optical director configured to at least one of couple light from the light source to the optical objective or couple reflected light from the sample when present to the detector.

70. The system of claim 69, wherein the optical director comprises at least one of a plurality of mirrors, a beamsplitter, a reflector, or an off-axis reflector.

71. The system of claim 1, comprising a condensing lens positioned along the optical path between the light source and the optical director.

72. The system of claim 71, wherein the collimator lens is positioned along the optical path between the condensing lens and the optical director.

73. The system of claim 71, wherein the aperture is positioned along the optical path between the condensing lens and the collimator lens.

74. A method comprising:
directing light from a light source through a collimator lens;
directing light from the collimator lens to an optical objective;
configuring the optical objective to couple output light from the light source to a sample under measurement when present, and direct reflected light from the sample;
configuring a controller to automatically control a color of the output light by selecting the color from a plurality of colors;
configuring the controller to automatically control a vertical position of the optical objective relative to the sample, wherein the vertical position includes a range of vertical positions scanned by the objective;
configuring a detector to receive the reflected light and to detect focus, and to output data representing a surface profile of the sample, wherein the data includes color images of the surface profile; and
configuring the controller to control a focus search using vertical scanning and data collection at each of a plurality of pixels in one of the color images of a surface of the sample.

75. A method comprising:
directing light from a light source through a collimator lens;
directing light from the collimator lens to an optical objective;
controlling the optical objective to couple output light from the light source to a sample under measurement, and direct reflected light from the sample;
automatically controlling a color of the output light by selecting the color from a plurality of colors;
automatically controlling a vertical position of the optical objective relative to the sample, wherein the vertical position includes a range of vertical positions scanned by the objective;
receiving the reflected light at a detector and detecting focus;
configuring a controller to control a focus search using vertical scanning and data collection at each of a plurality of pixels in an image of a surface of the sample; and
outputting data representing a surface profile of the sample, wherein the data includes color images of the surface profile.

* * * * *